United States Patent
Li et al.

(10) Patent No.: US 12,222,742 B2
(45) Date of Patent: Feb. 11, 2025

(54) FORCE FEEDBACK DEVICE

(71) Applicant: AAC Acoustic Technologies (Shanghai) Co., Ltd., Shanghai (CN)

(72) Inventors: Yuntong Li, Shanghai (CN); Bing Xie, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/342,695

(22) Filed: Jun. 27, 2023

(65) Prior Publication Data

US 2024/0272667 A1 Aug. 15, 2024

Related U.S. Application Data (63) Continuation of application No. PCT/CN2023/079486, filed on Mar. 3, 2023.

(30) Foreign Application Priority Data

Feb. 14, 2023 (CN) .......................... 202310120032.4

(51) Int. Cl.
 *G05G 1/04* (2006.01)
 *A63F 13/20* (2014.01)
 (Continued)

(52) U.S. Cl.
 CPC .............. *G05G 1/04* (2013.01); *A63F 13/20* (2014.09); *G05G 5/03* (2013.01); *G05G 5/05* (2013.01); *G05G 2505/00* (2013.01)

(58) Field of Classification Search
 CPC .. G05G 1/02; G05G 1/04; G05G 5/03; G05G 5/05; G05G 2505/00; A63F 13/218; A63F 13/20; A63F 13/24
 See application file for complete search history.

(56) References Cited

U.S. PATENT DOCUMENTS

| | | | |
|---|---|---|---|
| 12,079,024 B2 * | 9/2024 | Li | ............................ G05G 5/03 |
| 2024/0033620 A1 * | 2/2024 | Li | ........................... A63F 13/24 |

(Continued)

FOREIGN PATENT DOCUMENTS

| | | | | |
|---|---|---|---|---|
| CN | 212381196 U | * | 1/2021 | |
| CN | 113209605 A | * | 8/2021 | ............. A63F 13/24 |

(Continued)

*Primary Examiner* — Adam D Rogers
(74) *Attorney, Agent, or Firm* — W&G Law Group (57) ABSTRACT

The present invention provides a force feedback device. The force feedback device includes: a base; a trigger assembly, the trigger assembly including a trigger body, a connecting portion, a trigger, and an arc portion, the connecting portion being supported on the base through a first transmission shaft and forming a rotational connection; a driving assembly, the driving assembly including a driving unit and a second transmission shaft, the second transmission shaft being arranged opposite to the arc portion; the second transmission shaft including a transmission shaft body connected to the driving unit and a spiral groove formed on the transmission shaft body and extending along an axial direction of the transmission shaft body; and a transmission medium, the transmission medium being arranged, in a surrounding manner, in the spiral groove of the second transmission shaft.

7 Claims, 11 Drawing Sheets

(51) Int. Cl.
*G05G 5/03* (2008.04)
*G05G 5/05* (2006.01)

(56) References Cited

U.S. PATENT DOCUMENTS

2024/0050846 A1* 2/2024 Zhang .................... A63F 13/24
2024/0053788 A1* 2/2024 Li ........................... G05G 1/04

FOREIGN PATENT DOCUMENTS

| CN | 113380570 | A | * | 9/2021 | |
| CN | 115317895 | A | * | 11/2022 | ............. G05G 1/015 |
| CN | 116301360 | B | * | 10/2023 | |

* cited by examiner

FORCE FEEDBACK DEVICE

TECHNICAL FIELD

The present invention relates to the technical field of force feedback, and in particular, to a force feedback device.

BACKGROUND

With the development of network technologies and electronic information technologies and the development of an increasing number of games, various operating handles, virtual reality devices, and augmented reality devices, users have higher and higher sensory requirements in use of external devices.

Triggers on various handles or peripherals in the related art are directly connected to buttons, adjustment cannot be made according to different game scenarios, and some only provide certain vibration feedback, which makes it difficult to provide users with good gaming experience and cannot provide the users with immersive gaming experience. As an important characteristic in haptic feedback, force feedback has been paid more and more attention to with the development of different electronic devices, especially the evolution of personal consumer electronic products.

However, a rope of a force feedback device in the related art is easy to loose during transmission, and the rope is easy to slip on a driving shaft, which limits transfer of a relatively large force. Moreover, a feedback force control effect is poor, and good user experience cannot be provided.

Therefore, there is a need to provide a new force feedback device to solve the above problems.

SUMMARY

The technical problem to be solved in the present invention is to provide a force feedback device with a simple apparatus structure, an anti-slip effect, a smooth and controllable feedback force, and good user experience.

To solve the above technical problem, the present invention provides a force feedback device, wherein the force feedback device includes:
  a base;
  a trigger assembly, the trigger assembly including a trigger body, a connecting portion extending from an end of the trigger body close to the base, a trigger formed by extending from a circumferential side of the trigger body in a direction away from the base, and an arc portion connected to the trigger body, the connecting portion being supported on the base through a first transmission shaft and forming a rotational connection, the arc portion being arranged apart and opposite to the connecting portion and extending toward the base;
  a driving assembly, the driving assembly including a driving unit fixed to the base and a second transmission shaft connected to the driving unit, the second transmission shaft is arranged opposite to the arc portion; the second transmission shaft including a transmission shaft body connected to the driving unit and a spiral groove formed on the transmission shaft body and extending along an axial direction of the transmission shaft body; and
  a transmission medium, the transmission medium being arranged, in a surrounding manner, in the spiral groove of the second transmission shaft, and two drawn-out ends of the transmission medium arranged to surround the second transmission shaft respectively extending in opposite directions along a circumferential direction of the arc portion and being fixed to two ends of the arc portion, so that part of the transmission medium abuts against the arc portion.

As an improvement, the transmission medium is a transmission rope or a transmission belt.

As an improvement, the second transmission shaft includes a second transmission shaft body connected to the driving unit and a shaft sheath sleeved on and fixed to the second transmission shaft body, and the spiral groove is provided on an outer surface of the shaft sheath.

As an improvement, the arc portion includes an arc portion body, a first arc structure extending from the arc portion body toward the base and spaced apart from the base, and a second arc structure extending from the arc portion body toward the trigger body and connected to the trigger body, and the second transmission shaft is arranged opposite to the arc portion body; and the two drawn-out ends of the transmission medium arranged to surround the second transmission shaft respectively extend along the first arc structure and the second arc structure and are respectively fixed to positions at ends of the first arc structure and the second arc structure away from each other and diagonal to each other.

As an improvement, the arc portion further includes a stop block, the arc portion includes an arc portion body, a first arc structure extending from the arc portion body toward the base and spaced apart from the base, and a second arc structure extending from the arc portion body toward the trigger body and connected to the trigger body, and the second transmission shaft is arranged opposite to the arc portion body; and the stop block abuts against the arc portion body, one drawn-out end of the transmission medium arranged to surround the second transmission shaft extends along the second arc structure and then is bent and fixed to the stop block, and the other drawn-out end of the transmission medium arranged to surround the second transmission shaft extends along the first arc structure and then is bent to a side of the first arc structure away from the arc portion body and fixed, through a screw, to the first arc structure away from the arc portion body.

As an improvement, two transmission mediums are provided, and the two transmission mediums are respectively arranged to surround the second transmission shaft and spaced apart from each other; and after the two transmission mediums are arranged to surround the second transmission shaft, two ends thereof close to each other are respectively fixed to the second transmission shaft, and two ends thereof away from each other are respectively fixed to positions at sides of the first arc structure and the second arc structure away from each other and diagonal to each other, or two ends thereof away from each other are respectively fixed to sides of the stop block and the first arc structure away from the arc portion body.

As an improvement, two transmission mediums are provided, and the two transmission mediums are respectively arranged to surround the second transmission shaft and spaced apart from each other; and after the two transmission mediums are arranged to surround the second transmission shaft, two ends thereof away from each other are respectively fixed to the second transmission shaft, and two ends thereof close to each other are respectively fixed to positions at sides of the first arc structure and the second arc structure away from each other and diagonal to each other, or two ends thereof away from each other are respectively fixed to sides of the stop block and the first arc structure away from the arc portion body.

As an improvement, an end of the first arc structure close to the base extends to form a first limiting block, an end of the second arc structure close to the trigger extends to form a second limiting block, and the two drawn-out ends of the transmission medium arranged to surround the second transmission shaft are respectively fixed to sides of the first limiting block and the second limiting block.

As an improvement, the force feedback device further includes a limiting shaft, the arc portion body penetrates to form a limiting groove having a waist-shaped structure, and the limiting shaft passes through the limiting groove and is fixed to the base.

As an improvement, the force feedback device further includes a torsion spring, and an end of the base located at the first transmission shaft is provided with a fixed portion, the torsion spring sleeved on the fixed portion, and two ends of the torsion spring respectively abutting against the base and the trigger.

As an improvement, the transmission medium, the second transmission shaft, and the arc portion are integrally arranged, and two ends of the transmission medium are respectively arranged to surround the second transmission shaft and the arc portion.

As an improvement, a position of the spiral groove is preset to ΔL; wherein an end face distance from a first turn of the transmission medium around the second transmission shaft to an available width of the arc portion is ΔL, a pitch is P, a depth is t, the available width of the arc portion is L, and a number of winding windings of the transmission medium is N, where N is greater than or equal to 1, and the depth t=d/2.

Specifically, the spiral groove 422 can be directly machined on the second transmission shaft body, so that the transmission rope can be directly wound on the second transmission shaft 42 with the spiral groove 422. A position of the spiral groove 422 on the second transmission shaft 42 or the spiral groove 422 on the shaft sheath is ΔL. ΔL is an end face distance from a first turn of winding to an available width of an arc surface, and the pitch P and the depth t are related to the available width L of the arc surface, the number of windings N of the transmission medium 5.

Compared with the related art, according to the force feedback device in the present invention, the trigger assembly is rotatably mounted on the base, the trigger assembly includes a trigger body, a connecting portion extending from an end of the trigger body close to the base, a trigger formed by extending from a circumferential side of the trigger body in a direction away from the base, and an arc portion connected to the trigger body, the connecting portion is supported on the base through a first transmission shaft and forms a rotational connection, the arc portion is arranged apart and opposite to the connecting portion and extends toward the base, the driving assembly including a driving unit fixed to the base and a second transmission shaft connected to the driving unit, and the second transmission shaft is arranged opposite to the arc portion. The second transmission shaft includes a transmission shaft body connected to the driving unit and a spiral groove formed on the transmission shaft body and extending along an axial direction of the transmission shaft body. The transmission medium is arranged, in a surrounding manner, in the spiral groove of the second transmission shaft, and two drawn-out ends of the transmission medium arranged to surround the second transmission shaft respectively extend in opposite directions along a circumferential direction of the arc portion and are fixed to two ends of the arc portion, so that part of the transmission medium abuts against the arc portion. In this way, the transmission medium is arranged to surround the second transmission shaft, and the two ends of the transmission medium extend along the arc portion and are fixed to the two ends of the arc portion. The second transmission shaft includes a transmission shaft body and a spiral groove formed on the transmission shaft body, and the transmission medium is arranged, in a surrounding manner, in the spiral groove. Through a connection between the spiral groove and the transmission medium, the transmission medium may not slip relative to the second transmission shaft, which facilitates the driving unit to drive the second transmission shaft to drive the transmission medium to adjust the trigger to swing to achieve a force feedback effect. An overall space is compact, and friction resistance is small, which is convenient to improve a user experience effect.

BRIEF DESCRIPTION OF DRAWINGS

In order to more clearly illustrate the technical solutions in the embodiments of the present invention, the accompanying drawings used in the description of the embodiments will be briefly introduced below. It is apparent that, the accompanying drawings in the following description are only some embodiments of the present invention, and other drawings can be obtained by those of ordinary skill in the art from the provided drawings without creative efforts.

DESCRIPTION OF EMBODIMENTS

The technical solutions in the embodiments of the present invention will be clearly and completely described below with reference to the accompanying drawings in the embodiments of the present invention. Obviously, the described embodiments are only part of instead of all of the embodiments of the present invention. Based on the embodiments in the present invention, all other embodiments obtained by those of ordinary skill in the art without creative efforts fall within the protection scope of the present invention.

Referring to FIG. 1 to FIG. 11, a force feedback device 100 is provided, including: a base 1, a trigger assembly 2, a driving assembly 4, and a transmission medium 5.

The base 1 is configured to mount and fix the driving assembly 4 and support and arrange the trigger assembly 2.

The trigger assembly 2 includes a trigger body 21, a connecting portion 22 extending from an end of the trigger body 21 close to the base 1, a trigger 23 formed by extending from a circumferential side of the trigger body 21 in a direction away from the base 1, and an arc portion 24 connected to the trigger body 21. The connecting portion 22 is supported on the base 1 through a first transmission shaft 3 and forms a rotational connection, and the arc portion 24 is arranged apart and opposite to the connecting portion 22 and extends toward the base 1. Therefore, the trigger body 21 can rotate on the base 1 by taking the connecting portion 22 as a rotating position.

The driving assembly 4 includes a driving unit 41 fixed to the base 1 and a second transmission shaft 42 connected to the driving unit 41, and the second transmission shaft 42 is arranged opposite to the arc portion 24. The second transmission shaft 42 includes a transmission shaft body 421 connected to the driving unit 41 and a spiral groove 422 formed on the transmission shaft body 421 and extending along an axial direction of the transmission shaft body 421. As an improvement, the driving unit 41 may be a motor. The motor has stable driving and a good control effect.

The transmission medium 5 is arranged, in a surrounding manner, in the spiral groove 422 of the second transmission shaft 42, and two drawn-out ends of the transmission medium 5 arranged to surround the second transmission shaft 42 respectively extend in opposite directions along a circumferential direction of the arc portion 24 and are fixed to two ends of the arc portion 24, so that part of the transmission medium 5 abuts against the arc portion.

Through a connection between the spiral groove 422 and the transmission medium 5, the transmission medium 5 may not slip relative to the second transmission shaft 42, which facilitates the driving unit 41 to drive the second transmission shaft 42 to drive the transmission medium 5 to adjust the trigger 23 to swing to achieve a force feedback effect. An overall space is compact, and friction resistance is small, which is convenient to improve a user experience effect.

In this embodiment, the transmission medium 5 is a transmission rope or a transmission belt. The transmission rope or transmission belt is easy to wind, which does not require a tension holding device such as a spring during transfer of low tension, and can be directly tightened and fixed by certain tension. Due to the spiral groove 422, the transmission rope may not slip relative to a rotating shaft. The entire apparatus is simple and reliable.

In this embodiment, the second transmission shaft 42 includes a second transmission shaft body 423 connected to the driving unit 41 and a shaft sheath 424 sleeved on and fixed to the second transmission shaft body 423, and the spiral groove 422 is provided on an outer surface of the shaft sheath 424. It is convenient to drive the transmission medium 5 to move, so as to adjust a position of the trigger 23 to achieve a force feedback effect.

Specifically, the spiral groove 422 can be directly machined on the second transmission shaft body, so that the transmission rope can be directly wound on the second transmission shaft 42 with the spiral groove 422. A position of the spiral groove 422 on the second transmission shaft 42 or the spiral groove 422 on the shaft sheath is $\Delta L$. $\Delta L$ is an end face distance from a first turn of winding to an available width of an arc surface, and the pitch P and the depth t are related to the available width L of the arc surface, the number of windings, and a diameter d of the rope. During the winding, it is required to ensure that the transmission rope is just located in the spiral groove 422. A cross section of an arc groove is the same as the diameter of the transmission rope, or slightly larger, and the depth is $t=d/2$. Moreover, the transmission rope is required to run along the spiral groove 422, and the transmission ropes at two ends bypass an end face of the arc portion along an unfolding line of a helix. In order to ensure that the transmission rope is just located in the spiral groove 422 and make full use of an effective width of the arc surface, there is a need to select an appropriate pitch P and adjust a relative position $\Delta L$ between the sheath and the arc surface. Through the spiral groove 422, the transmission rope may not slip relative to the rotating shaft. Transmission efficiency is increased, resistance is reduced, and control over a feedback force is facilitated.

In this embodiment, the arc portion 24 includes an arc portion body 241, a first arc structure 242 extending from the arc portion body 241 toward the base 1 and spaced apart from the base 1, and a second arc structure 243 extending from the arc portion body 241 toward the trigger body and connected to the trigger body 21, the second transmission shaft 42 is arranged opposite to the arc portion body 241, and the two drawn-out ends of the transmission medium 5 arranged to surround the second transmission shaft 42 respectively extend along the first arc structure 242 and the second arc structure 243 and are respectively fixed to positions at ends of the first arc structure 242 and the second arc structure 243 away from each other and diagonal to each other. The arrangement of the transmission medium 5 is convenient, the transmission medium 5 may not be excessively bent, and a service life is prolonged.

In this embodiment, the arc portion further includes a stop block 7, the arc portion 24 includes an arc portion body 241, a first arc structure 242 extending from the arc portion body 241 toward the base 1 and spaced apart from the base 1, and a second arc structure 243 extending from the arc portion body 241 toward the trigger body 21 and connected to the trigger body 21, and the second transmission shaft 42 is arranged opposite to the arc portion body 241. The stop block 7 abuts against the arc portion body 241, one drawn-out end of the transmission medium 5 arranged to surround the second transmission shaft 42 extends along the second arc structure 243 and then is bent and fixed to the stop block 7, and the other drawn-out end of the transmission medium 5 arranged to surround the second transmission shaft 42 extends along the first arc structure 242 and then is bent to a side of the first arc structure 242 away from the arc portion body 241 and fixed, through a screw, to the first arc structure away from the arc portion body 241. It is convenient to wind and mount the transmission medium 5.

It may be understood that the stop block 7 may be fixed to the arc portion body 241 or may be tightened through a transmission rope to abut against the arc portion body 241. As an improvement, the transmission rope can be fixed by glue in cooperation with a perforated groove at one end of the transmission rope, the stop block 7 can be omitted, and the other end is tightened with a screw 8 after the winding is completed.

In this embodiment, two transmission mediums 5 are provided, and the two transmission mediums 5 are respectively arranged to surround the second transmission shaft 42 and spaced apart from each other. After the two transmission mediums 5 are arranged to surround the second transmission shaft 42, two ends thereof close to each other are respectively fixed to the second transmission shaft 42, and two ends thereof away from each other are respectively fixed to positions at sides of the first arc structure 242 and the second arc structure 243 away from each other and diagonal to each other, or two ends thereof away from each other are respectively fixed to sides of the stop block 7 and the first arc structure 242 away from the arc portion body 241.

In this embodiment, two transmission mediums 5 are provided, and the two transmission mediums 5 are respectively arranged to surround the second transmission shaft 42 and spaced apart from each other. After the two transmission mediums 5 are arranged to surround the second transmission shaft 42, two ends thereof away each other are respectively fixed to the second transmission shaft 42, and two ends thereof close to each other are respectively fixed to positions at sides of the first arc structure 242 and the second arc structure 243 away from each other and diagonal to each other, or two ends thereof away from each other are respectively fixed to sides of the stop block 7 and the first arc structure 242 away from the arc portion body 241.

In this embodiment, for example, the transmission medium 5 is a transmission rope, the transmission rope includes a first section 51 and a second section 52 which are arranged separately, a first end of the first section 51 is fixed to the arc portion 24, and a second end of the first section 51 encircles the second transmission shaft 42 a plurality of coiling and is fixed to the second transmission shaft 42. A first end of the second section 52 is fixed to the arc portion 24, and a second end of the second section 52 encircles the second transmission shaft 42 a plurality of coiling and is fixed to the second transmission shaft 42.

Figure 1:
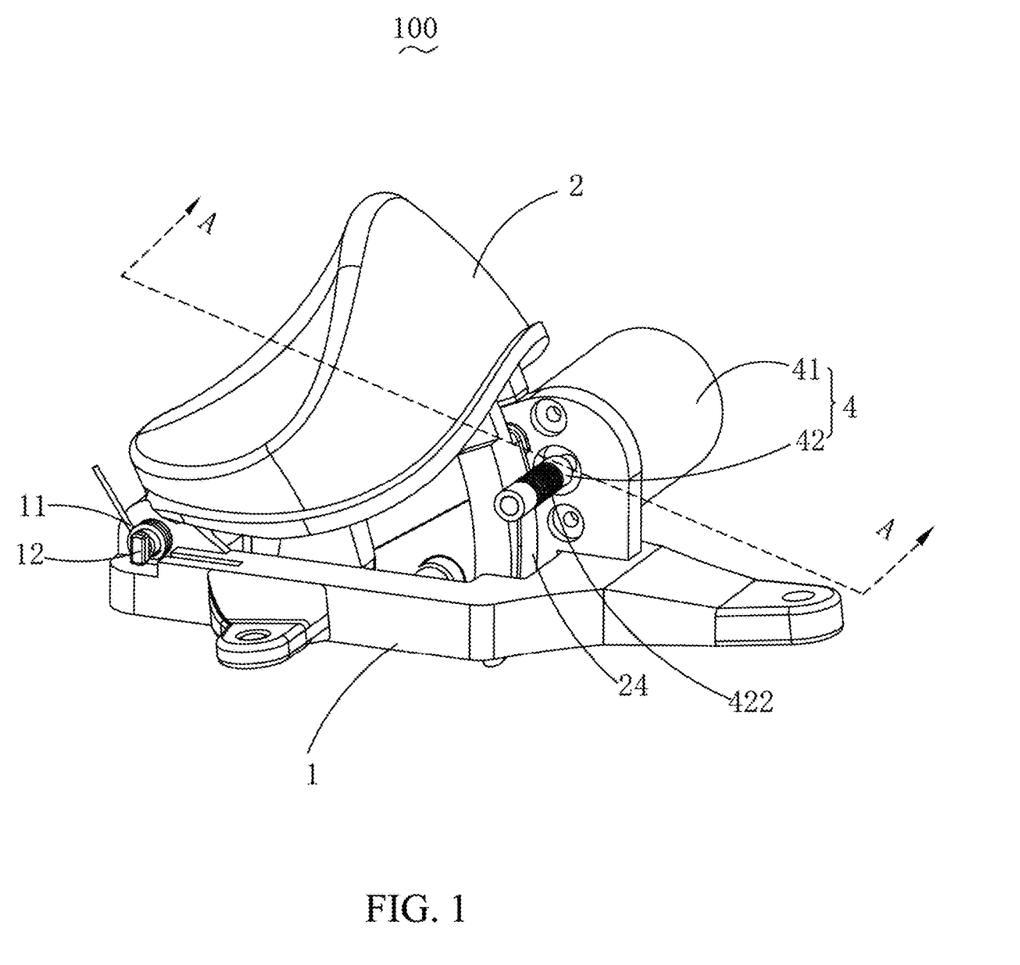
FIG. 1 is a schematic structural diagram of a force feedback device according to the present invention.
Figure 2:
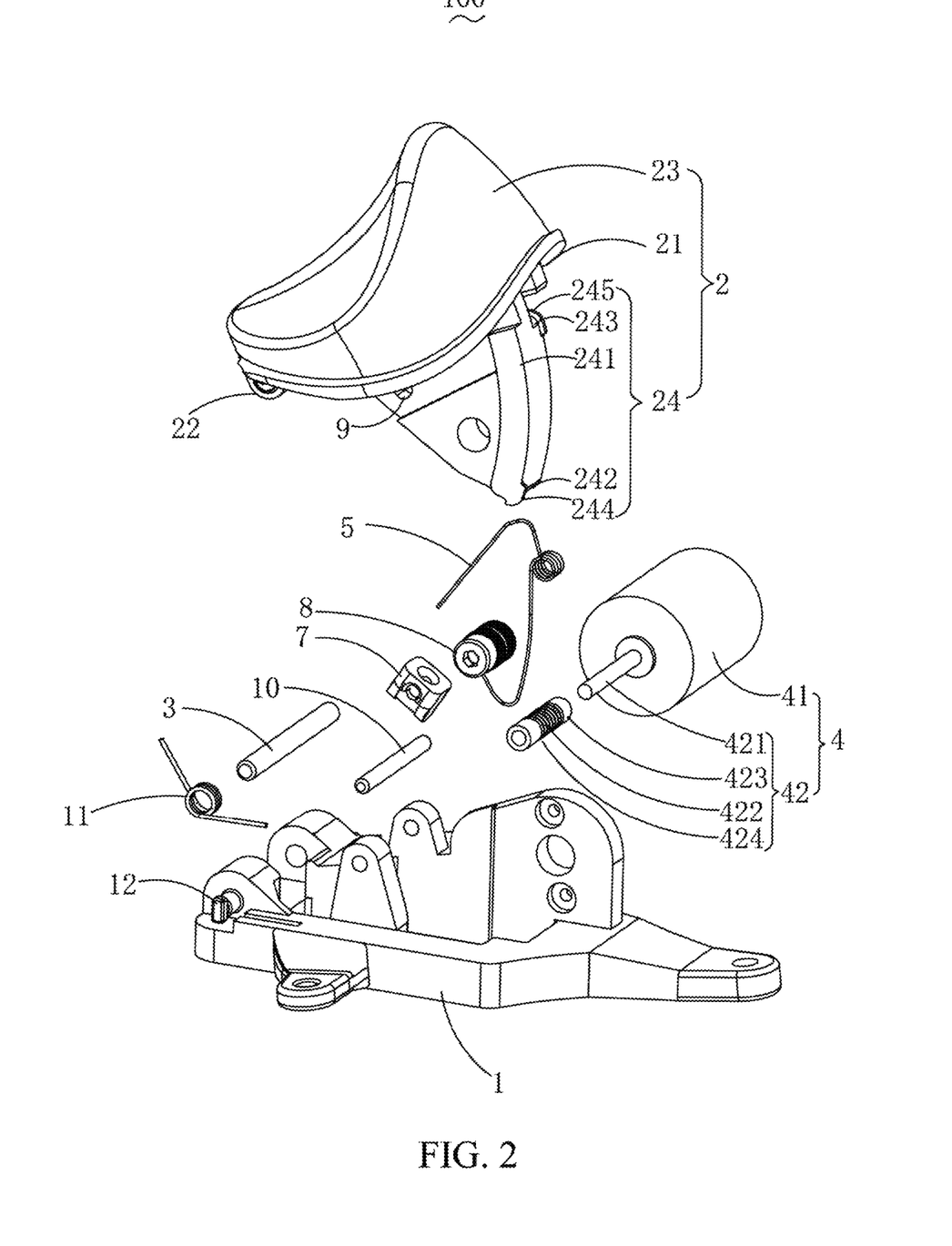
FIG. 2 is an exploded view of FIG. 1.
Figure 3:
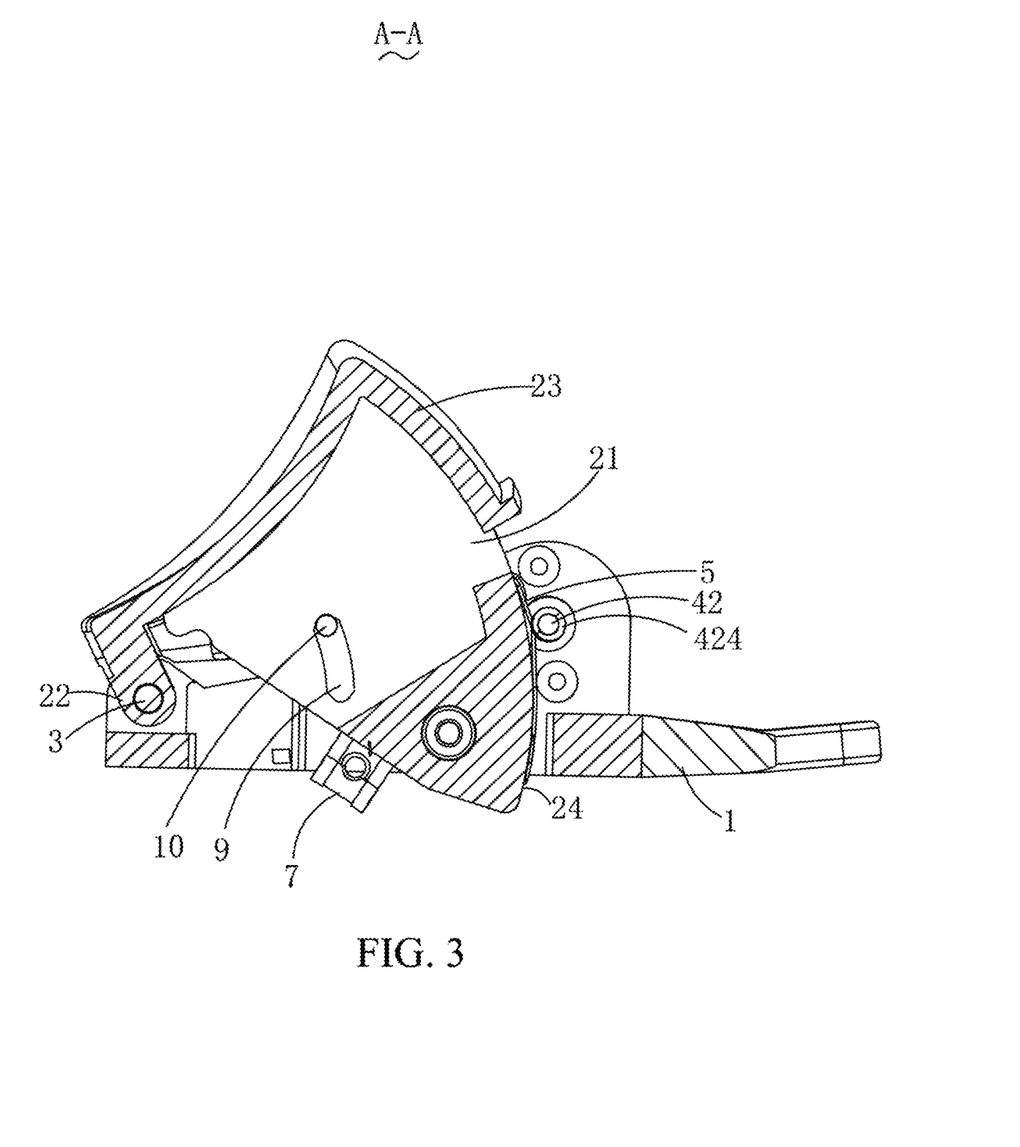
FIG. 3 is a sectional view taken along a line A-A in FIG. 1.
Figure 4:
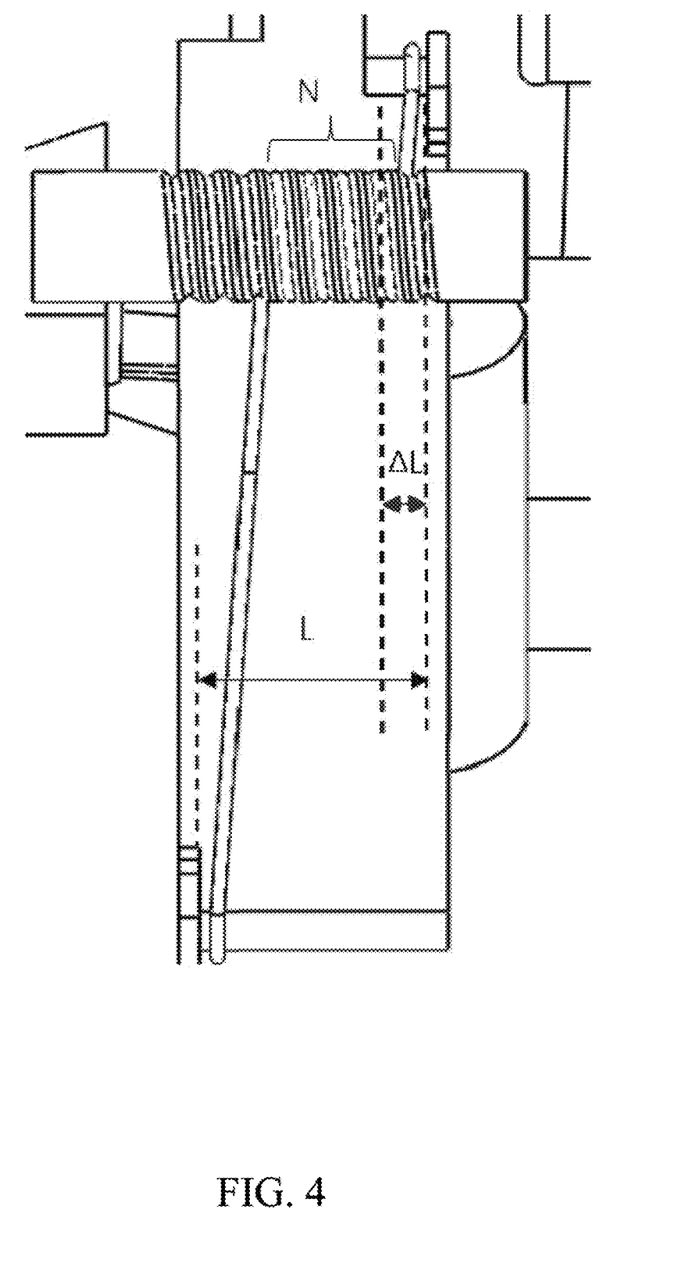
FIG. 4 is a schematic structural diagram of assembly of a shaft sheath and a transmission medium according to the present invention.
Figure 5:
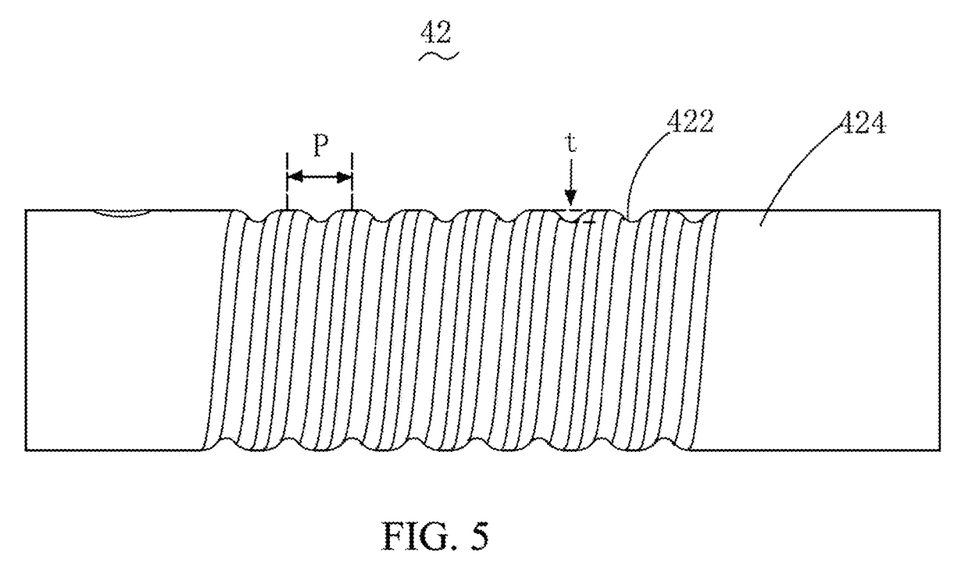
FIG. 5 is a schematic structural diagram of the shaft sheath according to the present invention.
Figure 6:
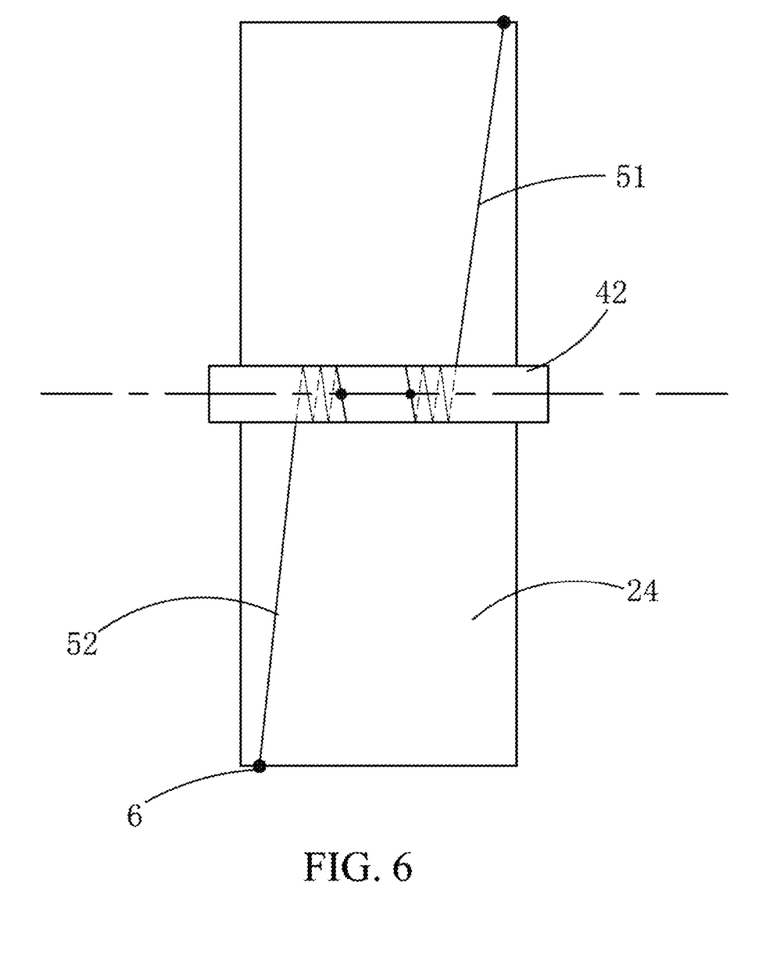
FIG. 6 is a schematic diagram of a first winding manner of a transmission rope according to the present invention.

As an improvement, in order to effectively prevent slipping and ensure reliability of mounting, two other winding manners are proposed. The first one is shown in FIG. 6, in which the transmission rope is divided into two sections, with one section arranged in each direction. The transmission rope may be pre-fixed to the second transmission shaft 42. The second transmission shaft 42 herein may be a motor shaft or a sheath sleeved on the motor shaft. The transmission rope is wound around the second transmission shaft 42 a plurality of coiling at a certain angle (a number of coiling is determined according to a transmission angle and a transmission ratio), and then along the arc portion 24, continues to be fixed to the arc portion 24 along a winding angle direction. So far, one section of the transmission rope has been mounted. Similarly, the other section of the transmission rope is fixed to the second transmission shaft 42 and the arc portion 24 with the same method. In this way, under a condition of no tensile creep, the transmission rope may no longer slip during the transmission and can transfer a stable force.

Figure 7:
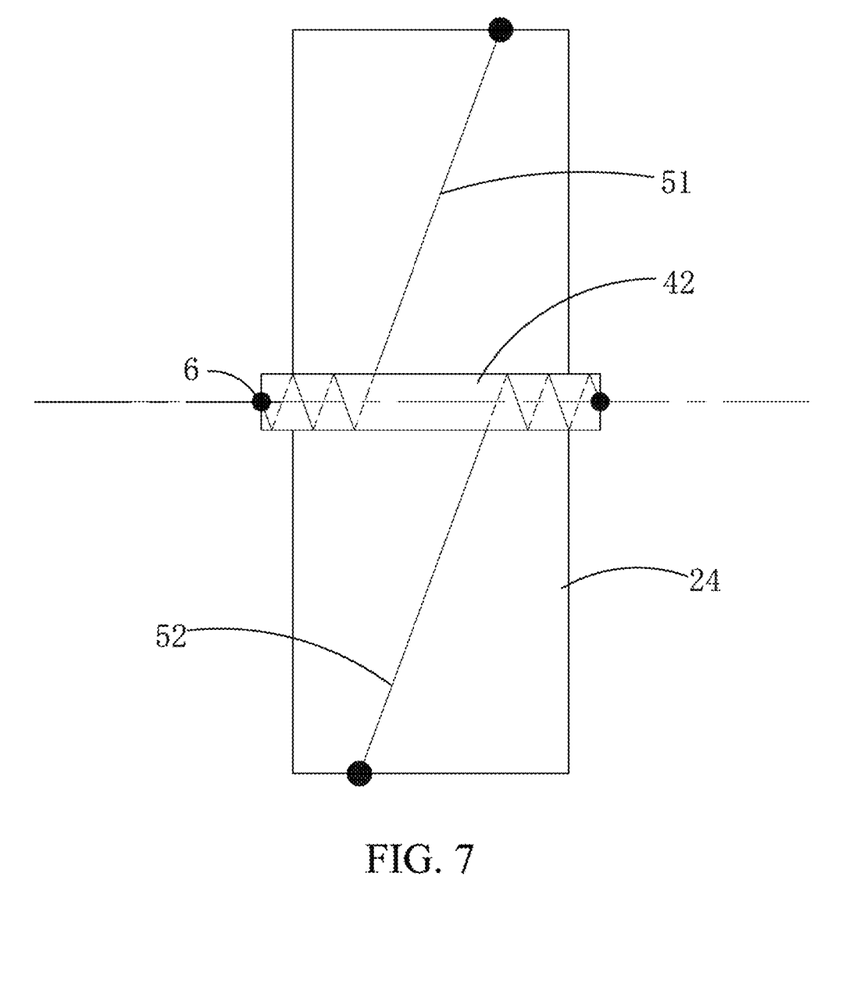
FIG. 7 is a schematic diagram of a second winding manner of the transmission rope according to the present invention.

Further, the second winding manner is shown in FIG. 7, in which the transmission rope is divided into two sections, with one section arranged in each direction. The transmission rope may be pre-fixed to the second transmission shaft 42. Anchor points 6 herein may be placed at two ends of the second transmission shaft 42, so that the transmission rope is wound in the middle of the second transmission shaft 42. The transmission rope is wound around the second transmission shaft 42 a plurality of coiling at a certain angle (a number of coiling is determined according to a transmission angle and a transmission ratio), and then along the arc portion 24, continues to be fixed to the arc portion 24 along an angle direction of winding. So far, one section of the transmission rope has been mounted. Similarly, the other section of the transmission rope is fixed to the second transmission shaft 42 and the arc portion 24 with the same method. In this way, under a condition of no tensile creep, the transmission rope may no longer slip during the transmission and can transfer a stable force.

In this embodiment, an end of the first arc structure 242 close to the base 1 extends to form a first limiting block 244, an end of the second arc structure 243 close to the trigger 23 extends to form a second limiting block 245, and the two drawn-out ends of the transmission medium 5 arranged to surround the second transmission shaft are respectively fixed to sides of the first limiting block 244 and the second limiting block 245. The first limiting block 244 and the second limiting block 245 are configured to respectively restrict outward slipping of the two ends of the transmission medium 5 on the arc portion 24, so that the transmission medium 5 has a good transmission effect.

In this embodiment, the force feedback device 100 further includes a limiting shaft 10, the arc portion body 241 penetrates to form a limiting groove 9 having a waist-shaped structure, and the limiting shaft 10 passes through the limiting groove 9 and is fixed to the base 1. The limiting shaft 10 is fixed to the base 1 to limit a rotation position of the arc portion body 241, and safety is high.

In this embodiment, the force feedback device 100 further includes a torsion spring 11, an end of the base 1 located at the first transmission shaft 3 is provided with a fixed portion 12, the torsion spring 11 sleeves the fixed portion 12, and two ends of the torsion spring 11 respectively abut against the base 1 and the trigger 23. Elastic properties of the torsion spring 11 enable quick reset of the trigger 23, which is easy to operate.

In this embodiment, the transmission medium 5, the second transmission shaft 42, and the arc portion 24 are integrally arranged, and two ends of the transmission medium 5 are respectively arranged to surround the second transmission shaft and the arc portion 24.

Figure 8:
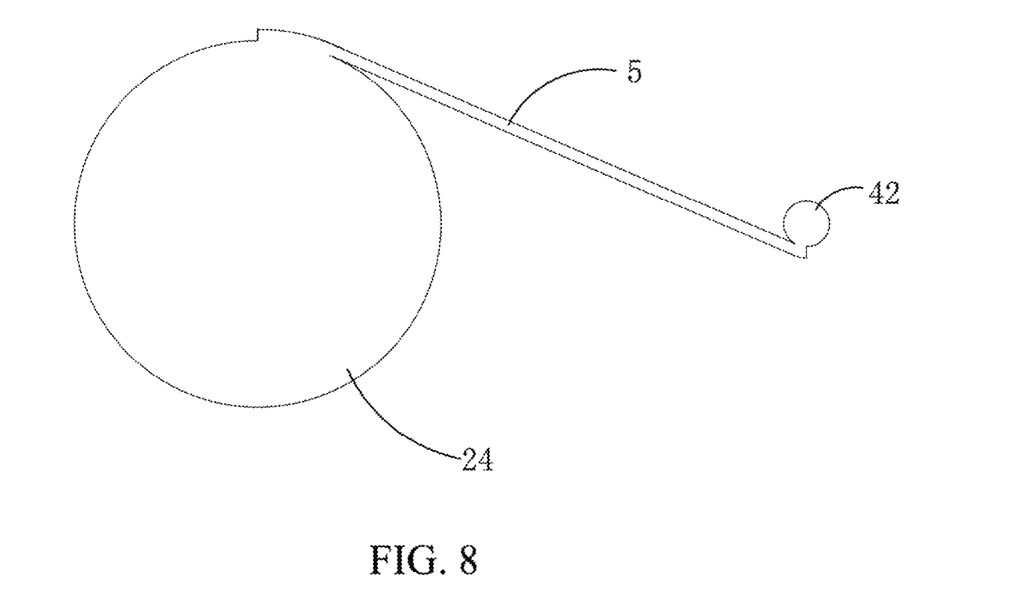
FIG. 8 is a schematic diagram of a first direction of a part unit according to the present invention.
Figure 9:
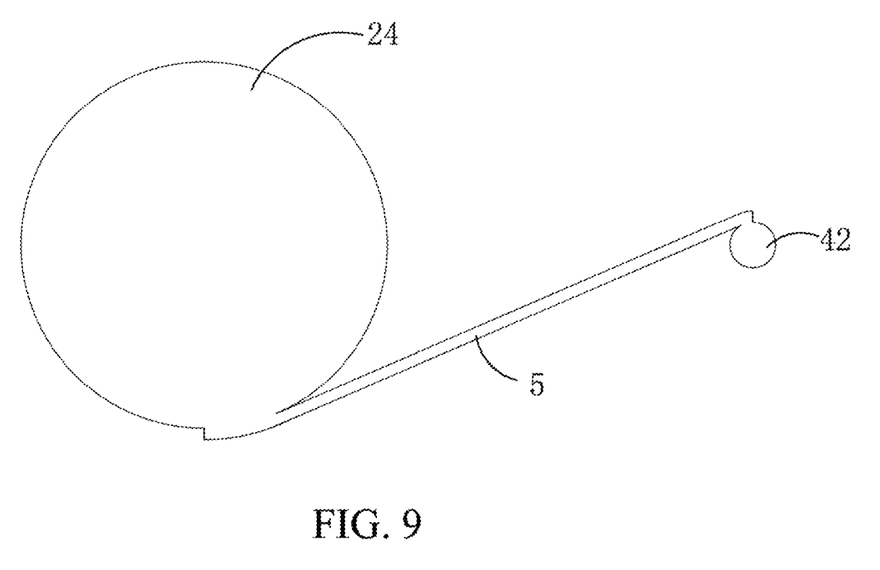
FIG. 9 is a schematic diagram of a second direction of the part unit according to the present invention.
Figure 10:
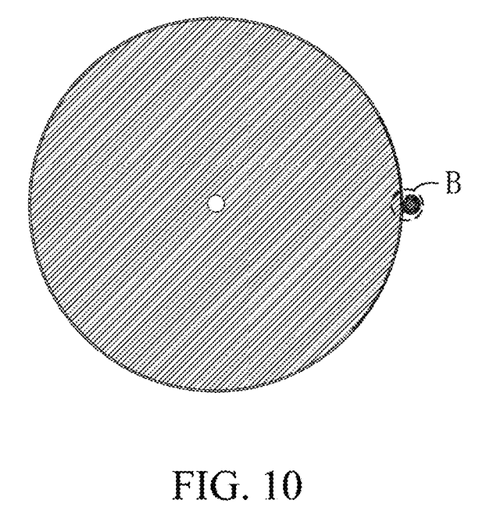
FIG. 10 is a schematic diagram of a combination of the first direction and the second direction of the part unit according to the present invention.
Figure 11:
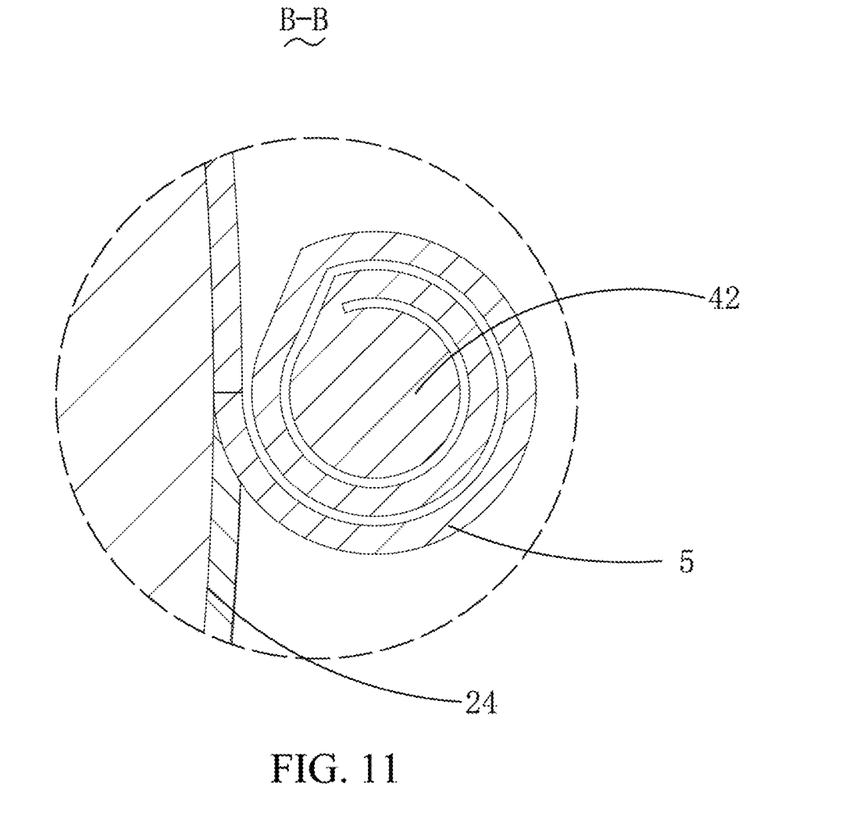
FIG. 11 is a partial enlarged view of B in FIG. 10.

Specifically, in order to reduce the mounting of the anchor point 6, the transmission medium 5 (transmission rope or transmission belt), the second transmission shaft 42, and the arc portion 24 may be regarded as an entirety, and injection molding or other processes are used to make the three into a part unit, as shown in FIG. 8. The transmission medium 5 is flexible. A flexible portion may be wound around a driving shaft portion and the arc portion 24. The driving shaft portion and the arc portion 24 are as close as possible to prevent excessive radial force of a driving shaft and an arc-shaped rotating shaft during transmission. FIG. 8 shows a pull in one direction, and FIG. 9 shows a pull in the other direction. FIG. 8 and FIG. 9 are assembled and combined into pulls in two directions, that is, rotation in two directions, as shown in FIG. 10 and FIG. 11.

Compared with the related art, according to the force feedback device in the present invention, the trigger assembly is rotatably mounted on the base, the trigger assembly includes a trigger body, a connecting portion extending from an end of the trigger body close to the base, a trigger formed by extending from a circumferential side of the trigger body in a direction away from the base, and an arc portion connected to the trigger body, the connecting portion is supported on the base through a first transmission shaft and forms a rotational connection, the arc portion is arranged apart and opposite to the connecting portion and extends toward the base, the driving assembly including a driving unit fixed to the base and a second transmission shaft connected to the driving unit, and the second transmission shaft is arranged opposite to the arc portion. The second transmission shaft includes a transmission shaft body connected to the driving unit and a spiral groove formed on the transmission shaft body and extending along an axial direction of the transmission shaft body. The transmission medium is arranged, in a surrounding manner, in the spiral groove of the second transmission shaft, and two drawn-out ends of the transmission medium arranged to surround the second transmission shaft respectively extend in opposite directions along a circumferential direction of the arc portion and are fixed to two ends of the arc portion, so that part of the transmission medium abuts against the arc portion. In this way, the transmission medium is arranged to surround the second transmission shaft, and the two ends of the transmission medium extend along the arc portion and are fixed to the two ends of the arc portion. The second transmission shaft includes a transmission shaft body and a spiral groove formed on the transmission shaft body, and the transmission medium is arranged, in a surrounding manner, in the spiral groove. Through a connection between the spiral groove and the transmission medium, the transmission medium may not slip relative to the second transmission shaft, which facilitates the driving unit to drive the second transmission shaft to drive the transmission medium to adjust the trigger to swing to achieve a force feedback effect. An overall space is compact, and friction resistance is small, which is convenient to improve a user experience effect.

The above descriptions are only embodiments of the present invention. It should be pointed out herein that, for those of ordinary skill in the art, improvements can also be made without departing from the creative concept of the present invention, all of which fall within the protection scope of the present invention.

What is claimed is:

1. A force feedback device, comprising:
a base;
a trigger assembly comprising a trigger body, a connecting portion extending from the trigger body, a trigger formed by extending from a circumferential side of the trigger body in a direction away from the base, and an arc portion connected to the trigger body, wherein the connecting portion is supported on the base through a first transmission shaft to form a rotational connection, and the arc portion is spaced apart and opposite to the connecting portion and extends toward the base; the connecting portion is extended from an end of the trigger body; the end of the trigger body is closer to the base than a portion of the trigger body connected to the arc portion;
a driving assembly comprising a driving unit fixed to the base and a second transmission shaft connected to the driving unit, wherein the second transmission shaft is arranged opposite to the arc portion; the second transmission shaft comprises a transmission shaft body connected to the driving unit and a spiral groove formed on the transmission shaft body and extending along an axial direction of the transmission shaft body; and
a transmission medium arranged, in a surrounding manner, in the spiral groove of the second transmission shaft, wherein after the transmission medium is arranged to surround the second transmission shaft respectively, two drawn-out ends of the transmission medium extend in opposite directions along a circumferential direction of the arc portion and are fixed to two ends of the arc portion, such that part of the transmission medium abuts against the arc portion.

2. The force feedback device as described in claim 1, wherein
the transmission medium is a transmission rope or a transmission belt.

3. The force feedback device as described in claim 1, wherein
the second transmission shaft comprises a second transmission shaft body connected to the driving unit and a shaft sheath sleeved on and fixed to the second transmission shaft body, and the spiral groove is provided on an outer surface of the shaft sheath.

4. The force feedback device as described in claim 1, wherein
the arc portion comprises an arc portion body, a first arc structure extending from the arc portion body toward the base and spaced apart from the base, and a second arc structure extending from the arc portion body toward the trigger body and connected to the trigger body; and
wherein the second transmission shaft is arranged opposite to the arc portion body; and after the transmission medium surrounds the second transmission shaft respectively, the two drawn-out ends of the transmission medium extend along the first arc structure and the second arc structure and are respectively fixed to positions at ends of the first arc structure and the second arc structure away from each other and diagonal to each other.

5. The force feedback device as described in claim 1, wherein
the arc portion further comprises a stop block, the arc portion comprises an arc portion body, a first arc structure extending from the arc portion body toward the base and spaced apart from the base, and a second arc structure extending from the arc portion body toward the trigger body and connected to the trigger body, and the second transmission shaft is arranged opposite to the arc portion body;
wherein the stop block abuts against the arc portion body, one drawn-out end of the two drawn-out ends extends along the second arc structure and then is bent around and fixed to the stop block, and the other drawn-out end of the two drawn-out ends extends along the first arc structure and then is bent to a side of the first arc structure away from the arc portion body and fixed, through a screw, to the first arc structure away from the arc portion body.

6. The force feedback device as described in claim 1, further comprising a torsion spring, wherein an end of the base located at the first transmission shaft is provided with a fixed portion, the torsion spring is sleeved on the fixed portion, and two ends of the torsion spring respectively abut against the base and the trigger.

7. The force feedback device as described in claim 1, wherein the transmission medium, the second transmission shaft, and the arc portion are integrally arranged, and two ends of the transmission medium are respectively arranged to surround the second transmission shaft and the arc portion.

* * * * *